Aug. 16, 1938.   W. M. GILMAN   2,127,293
POWER OPERATED MECHANISM
Filed Sept. 28, 1935
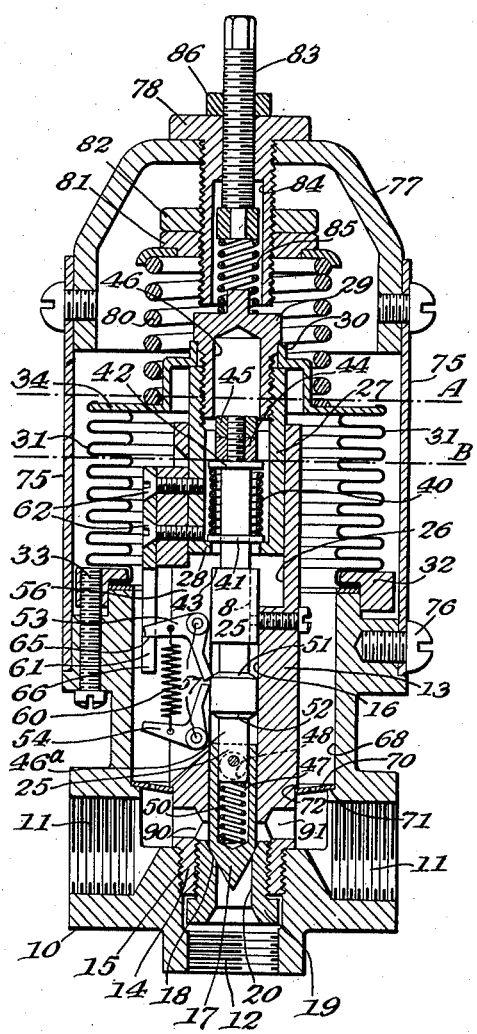
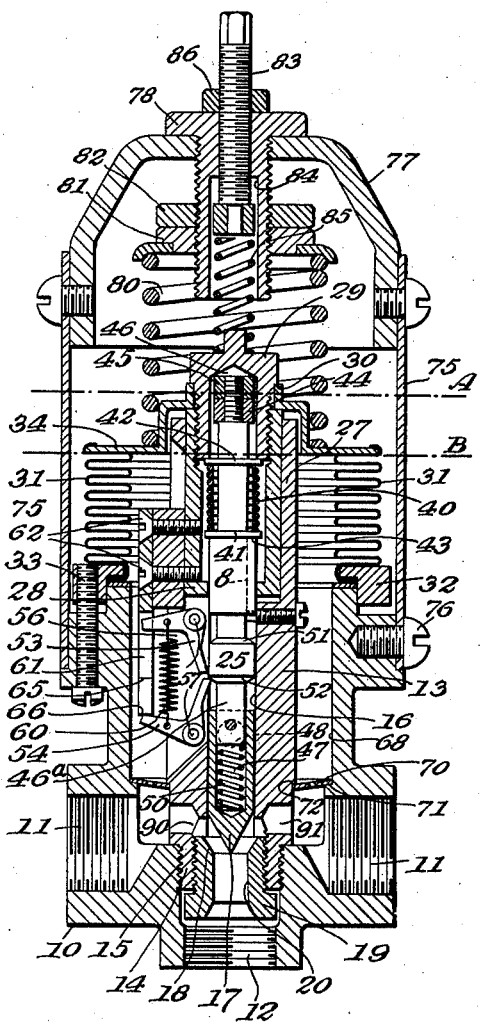
Inventor:
Wilbert M. Gilman
By Dike, Calver and Gray
Attorneys.

Patented Aug. 16, 1938

2,127,293

UNITED STATES PATENT OFFICE 2,127,293

POWER OPERATED MECHANISM

Wilbert M. Gilman, Cambridge, Mass.

Application September 28, 1935, Serial No. 42,678

2 Claims. (Cl. 137—153)

This invention relates to mechanism for moving a member between two positions, such as a mechanism for moving a valve member in an automatic pressure operated valve. More particularly, the invention is directed to mechanism of this general type in which the member to be moved is held in one of its positions while potential energy is developed which is released to snap the member to its other position.

It is an object of the invention to provide an improved mechanism of this general type which is simple, efficient, reliable and can be manufactured at low cost and possesses long life.

It is a further object of the invention to provide such a mechanism capable of a wide range of adjustment which can be conveniently effected to adapt it to special conditions of use.

These and other objects of the invention will be more clearly understood from the following description in conjunction with the accompanying drawing, in which:

Figs. 1 and 2 are sectional elevational views of a valve embodying the invention showing the parts in different relative positions.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The invention is illustrated in the accompanying drawing as embodied in an automatic pressure operated valve comprising a cup-shaped casing 10 having inlet and outlet openings 11 and 12 respectively. A sleeve 13 is mounted within the casing 10 and for this purpose is provided with an extension 14 threaded to engage a threaded recess 15 communicating with the outlet opening 12. The sleeve 13 is provided with a passage 16 adapted to receive and slidably guide a valve member 17 adapted to engage a valve seat 18 formed in the upper end of a plug 19 which is threaded into the extension 14 of the sleeve 13 and has a passage 20 providing communication between the passage 16 and the outlet opening 12. Passages 90 are formed in the sleeve 13 to provide communication between the inlet and outlet openings 11 and 12. A slide 25 is also movably guided in the passage 16 and extends upwardly into an enlarged passage 26 in the upper end of the sleeve 13. The slide 25 may be provided with a key-way 8 adapted to be engaged by a key carried by the sleeve 13.

A sleeve 27 having an inwardly extending flange 28 at its lower end surrounds the slide 25 and is slidably guided in the passage 26. The upper end of the sleeve 27 is internally threaded to receive a plug 29 having an annular shoulder 30. A bellows 31 is secured at its lower end between the top of the casing 10 and a clamping ring 32 secured to the casing by screws 33. The other end of the bellows 31 is secured to the outer edge of an annular disc 34, the inner edge portion of which extends upwardly and inwardly and is secured between the shoulder 30 upon the plug 29 and the top of the sleeve 27. A cover sleeve 75 surrounds the bellows 31 and is secured at its lower end by screws 76 to the casing 10. The top of the sleeve 75 carries a strap 77 having a threaded opening to receive a plug 78. A spring 80 is interposed between the disc 34 and an adjusting nut 81 carried by the threaded inner end of the plug 78 and held in its adjusted position by a lock nut 82. An adjusting screw 83 is carried by the plug 78 and extends into a cavity 84 therein. A spring 85 extends between the top of the plug 29 and the lower end of the adjusting screw 83. The adjusting screw 83 is held in its adjusted position by a lock nut 86.

The reduced lower end 46a of the slide 25 extends into a cavity 47 in the valve member 17 and carries a pin which projects laterally from the slide 25 into an enlarged opening 48 in the valve member 17 thereby providing a lost motion connection between the slide 25 and the valve member 17. A spring 50 is interposed between the lower end of the slide 25 and the bottom of a cavity 47 in the valve member 17. A spring 40 surrounds the slide 25 and is interposed between washers 41 and 42 adapted to engage respectively a shoulder 43 formed upon the slide 25 and the lower face of a nut 44 threaded upon the upper threaded end of the slide 25 and held in place by a lock nut 45, the plug 29 being provided with a cavity 46 adapted to receive the nuts 44 and 45.

The slide 25 is provided with spaced shoulders 51 and 52 adapted to be engaged by the inner ends of bell crank levers or triggers 53 and 54 which extend through a slot 56 in the sleeve 13 and are pivotally mounted upon bearings 57. The levers 53 and 54 are connected by a spring 60. Engagement of the levers 53 and 54 with the shoulders 51 and 52 serve to prevent movement of the slide 25 and hold the valve member 17 in its closed and open positions respectively.

The sleeve 27 and the plug 29 together serve as an actuator and are so arranged that the inwardly extending flange 28 and the bottom of the plug may engage the washers 41 and 42 respectively. An arm 61 is secured by screws 62 to the sleeve 27 and is provided with shoulders 65 and 66 adapted to engage the outer ends of the levers 53 and 54 respectively to release the latter from their holding positions.

The outer surface of the sleeve 13 is spaced from the inner wall of the casing 10 so as to provide a passage 68 for the movement of the arm 61 and the outer ends of the levers 53 and 54, this passage also serving to provide communication between the inlet openings 11 and the interior of the bellows 31. In order to retard the flow of fluid between the inlet openings 11 and the bellows, a ring 70 may be positioned in the passage 68 with its outer edge engaging a shoulder 71 upon the inner wall of the casing and its inner edge engaging a shoulder 72 upon the outer surface of the sleeve 13.

As the pressure of fluid entering the bellows 31 through the inlet openings 11 and passage 68 increases the bellows 31 will expand causing the disc 34, the plug 29 and the sleeve 27 to rise. The upward movement of these parts is resisted by the springs 80 and 85. As the pressure of the fluid within the bellows 31 decreases the springs 80 and 85 tend to move the disc 34, plug 29 and sleeve 27 downward.

Assuming that the valve member 17 is in its closed position, as indicated in Fig. 1, and the pressure of the fluid within the bellows 31 is increasing, the inwardly extending flange 28 upon the sleeve 27 will engage the washer 41 and will tend to move the slide 25 upward through the medium of the spring 40. However, since the valve 17 is in its closed position, engagement of the trigger 53 with the shoulder 51 prevents movement of the slide 25 upwardly. Consequently, the upward movement of the sleeve 27 will cause the spring 40 to be compressed and build up potential energy therein. As the upward movement of the sleeve 27 continues the shoulder 65 upon the arm 61 will engage the outer end of the trigger 53 and release the latter from engagement with the shoulder 51 at about the time the top of the disc 34 reaches the position indicated by the dot and dash line A, thereby permitting the potential energy stored in the spring 40 to act to move the slide 25 upwardly and, consequently, move the valve member 17 from its closed position as shown in Fig. 1 to its open position as shown in Fig. 2. As the slide 25 moves upwardly the spring 60 will move the trigger 54 into engagement with the shoulder 52 thus preventing downward movement of the slide 25 and holding the valve member 17 in its open position.

As the pressure of the fluid within the bellows 31 decreases, the springs 80 and 85 will move the disc 34, plug 29 and sleeve 27 downwardly. In so doing, the bottom of the plug 29 will engage the washer 42 and compress the spring 40 and store potential energy therein tending to move the slide 25 downward. As the downward movement of the sleeve 27 continues, the shoulder 66 on the arm 61 will engage the outer end of the trigger 54 and release the latter from its engagement with the shoulder 52 at about the time the top of the disc 34 reaches the position of the dot and dash line B, thereby permitting the potential energy stored in the spring 40 to act to move the slide 25 downwardly and move the valve member 17 from its open position as shown in Fig. 2 to its closed position as shown in Fig. 1. When the valve member 17 engages the valve seat 18 the kinetic energy developed by the slide 25 will be absorbed by the spring 50 and the latter will be compressed an amount sufficient to permit the spring 60 to move the trigger 53 into engagement with the shoulder 51 thus preventing upward movement of the slide 25. The spring 50 will then be held under compression and will exert a downward pressure upon the valve member 17 tending to hold the latter tightly against its seat 18. Preferably, the characteristics of the spring 50 and its arrangement are such that the force exerted thereby tending to hold the valve member 17 seated is greater than the maximum force developed by the spring 40.

It will be understood that the springs 80 and 85 may be independently adjusted by adjustment of the nut 81 and adjusting screw 83 respectively, so that predetermined desired pressures may be exerted upon the disc 34 when it reaches the positions indicated by the dot and dash lines A and B in Figs. 1 and 2, thus controlling the pressures at which the valve member 17 will be moved from its closed position to its open position and from its open position to its closed position. Likewise, it will be understood that the potential energy developed by the spring 40 may be varied by the substitution of a spring having different characteristics thereby controlling as desired the force exerted by the spring 40 tending to move the valve member 17 toward and away from its seat 18.

One important advantage of the construction of the invention is that substantially the entire valve operating mechanism is carried by the sleeve 13 and, consequently, the mechanism may be tested for proper seating of the valve before assembly in the casing by inserting the plug 29 in the sleeve 27 with a disc, corresponding to the disc 34, interposed therebetween. This construction also facilitates service replacements in case, for example, of damage to the valve parts which might arise if used in a sulfur dioxide refrigerating system and moisture inadvertently gained access to the refrigerant.

I claim:

1. In a pressure operated mechanism, a casing having a fluid inlet and outlet, a sleeve detachably supported within said casing having a passage communicating with said outlet, a valve member movably carried by said sleeve to open and close said outlet, and valve operating mechanism carried by said sleeve comprising an actuator movable in opposite directions, means providing a seat for said valve member, a movable slide, a spring connected to said slide adapted to be actuated by movement of said actuator in both directions to store potential energy therein tending to move said slide, and means for holding said slide against movement until said actuator reaches a predetermined point in its movement in one direction and until said actuator reaches a predetermined position during its movement in the opposite direction, and means for releasing said holding means when said actuator reaches a predetermined point in its movement in one of said directions and when said actuator reaches a predetermined point in the opposite direction.

2. In a pressure operated mechanism, a casing having a fluid inlet and outlet, a sleeve detachably supported within said casing having a passage communicating with said outlet, a valve member movably carried by said sleeve to open and close said outlet, and valve operating mechanism carried by said sleeve comprising an actuator movable in opposite directions, means providing a seat for said valve member, a movable slide, a spring connected to said slide adapted to be actuated by movement of said actuator in both directions to store potential energy therein tending to move said slide, means for holding said slide against movement until said actuator reaches a predetermined point in its movement in one direction and until said actuator reaches a predetermined position during its movement in the opposite direction, means for releasing said holding means when said actuator reaches a predetermined point in its movement in one of said directions and when said actuator reaches a predetermined point in the opposite direction, and a lost motion connection between said slide and member including a spring interposed therebetween adapted to absorb kinetic energy developed by said slide and to exert pressure upon said member tending to hold it in one of its said positions.

WILBERT M. GILMAN.